United States Patent
Kaji et al.

[11] Patent Number: 5,834,719
[45] Date of Patent: Nov. 10, 1998

[54] CORD SWITCH

[75] Inventors: Tetsuya Kaji; Norihisa Kurihara, both of Yokohama, Japan

[73] Assignees: ASMO Co., Ltd., Shizuoka-ken; Bridgestone Corporation, Tokyo, both of Japan

[21] Appl. No.: 689,001

[22] Filed: Jul. 30, 1996

[30] Foreign Application Priority Data

Aug. 4, 1995 [JP] Japan ..................................... 7-200015
Sep. 27, 1995 [JP] Japan ..................................... 7-249723

[51] Int. Cl.$^6$ ............................. H01H 3/16; E05F 15/10; E05F 15/16
[52] U.S. Cl. ..................................... 200/61.44; 200/61.43; 49/28
[58] Field of Search .............................. 200/61.43, 61.44; 49/26–29

[56] References Cited

U.S. PATENT DOCUMENTS

| | | | |
|---|---|---|---|
| 3,465,476 | 9/1969 | Rayner et al. ................................. | 49/28 |
| 3,710,050 | 1/1973 | Richards ............................... | 200/61.43 |
| 3,793,772 | 2/1974 | Kouth ......................................... | 49/28 |
| 4,532,388 | 7/1985 | Sackmann et al. .................... | 200/61.43 |
| 5,023,418 | 6/1991 | Beckhausen ............................. | 200/511 |
| 5,072,080 | 12/1991 | Beckhausen ......................... | 200/61.43 |
| 5,296,658 | 3/1994 | Kramer et al. ........................ | 200/61.43 |
| 5,481,076 | 1/1996 | Mullet et al. ......................... | 200/61.43 |

FOREIGN PATENT DOCUMENTS

| | | | |
|---|---|---|---|
| 0 405 351 A1 | 1/1991 | European Pat. Off. ........ | E05F 15/00 |
| 353332 B1 | 4/1994 | European Pat. Off. ........ | E05F 15/00 |
| 32 32 365 A1 | 1/1984 | Germany ......................... | E05F 15/20 |
| 34 27 771 A1 | 6/1986 | Germany ......................... | E05F 15/16 |
| A-5-41282 | 2/1993 | Japan ............................. | H05B 33/14 |
| 7-7035 | 1/1995 | Japan . | |

OTHER PUBLICATIONS

European Search Report, Application No. 9635688.2, Jun. 11, 1996.

*Primary Examiner*—J. R. Scott
*Attorney, Agent, or Firm*—Oliff & Berridge, PLC

[57] ABSTRACT

A cord switch that includes a hollow flexible cord member, contact lines and a bridge conductor. The cord member includes two portions generally opposed to and spaced apart from each other in the transverse direction of the cord member. The contact lines are disposed in parallel to each other on one of the inner portions of the two portions of the cord member. The bridge conductor is disposed on the other of the two inner portions so as to be generally opposed to apart from the contact lines. When the cord member is pressed, the bridge conductor is brought into contact with the contact lines to energize the cord member. The cord switch is configured so that its neutral axis is positioned on the side of the one of two inner portions with respect to the central portion of the distance between the two wall portions. As a result, even if the cord switch is mounted at a corner portion of a window frame of a vehicle, contact between the contact lines and bridge conductor can be prevented.

20 Claims, 11 Drawing Sheets

CORD SWITCH

BACKGROUND OF THE INVENTION

1. Field of the Invention

The present invention relates to a cord switch which is switched over when a cord member of the cord switch is pressed.

2. Description of the Related Art

In a window regulator driven by a motor to raise and lower a glass of a vehicle door, for example, considering the safety for the user of the vehicle, a cord switch is mounted on a window frame of the vehicle door and the cord switch is pressed and switched over, for example from OFF to ON, when any obstacle is jammed between the cord switch and the glass of the vehicle door, so that rotation of the motor is stopped or reversed.

As shown in FIG. 16, a cord switch 60 has a hollow flexible cord member 62 such as a silicone, a rubber or the like in which the cord member 62 is provided with contact lines 64 at an upper wall portion 62A (corresponding to one of two wall portions of the cord member 62 opposed to each other) and a lower wall portion 62B (corresponding to the other of two wall portions), respectively. When the cord member 62 is pressed, these contact lines 64 are brought into contact with each other.

However, when the cord switch 60 is mounted on the window frame of the vehicle door, it may be bent largely at the corner of the window frame. Therefore, the contact lines 64 may be brought into contact with each other at the time of the mounting work of the cord switch 60 on the window frame.

Therefore, as shown in FIG. 17, a cord switch 72 is shown in which a bridge conductor 68 is disposed at an upper wall portion 66A of a cord member 66 and two contact lines 71 are disposed at a lower wall portion 66B of the cord member 66 with a barrier wall 70 being interposed between these contact lines 71. Note Japanese Patent Laid-Open Application Serial No. 7-7035.

The cord switch 72 is structured such that even if a bending force is applied to the cord switch 72, since the distal end of the barrier wall 70 abuts on the bridge conductor 68, the bridge conductor 68 and the contact lines 71 are not brought into contact with each other, unnecessarily.

However, the bridge conductor 68 is not brought into contact with these contact lines 71 unless the force which acts on the cord member 66 is strong enough to deform the barrier wall 70. Further, when the force acts on the barrier wall 70 vertically, the bridge conductor 68 is pressed in parallel to the barrier wall 70 and is brought into contact with the contact lines 71. However, if a pressing force from a diagonal or transverse direction acts on the barrier wall 70, the barrier wall 70 is not deformed but is inclined by the force and the bridge conductor 68 is pressed diagonally, so that the bridge conductor 68 does not come into contact with both of the contact lines 71.

SUMMARY OF THE INVENTION

In view of the aforementioned facts, it is an object of the present invention to accomplish a desired bendability in a cord switch and to obtain a cord switch which prevents contact lines and a bridge conductor from being brought into contact with each other even if the cord switch is bent or flexed, which enables the contact lines and the bridge conductor to be in contact with each other even if a pressing force which acts on the cord switch is relatively low, and which enables the contact lines and the bridge conductor to be in contact with each other even if a pressing force from a diagonal direction acts on the cord switch.

In accordance with a first embodiment of the present invention, the cord switch, comprising: a hollow flexible cord member; contact lines which are provided in parallel to each other on one of the inner portions of two portions of said cord member generally opposed to each other and which are spaced apart from each other in the transverse direction of said cord member; a bridge conductor which is provided on the other of said inner portions so as to be generally opposed to said contact lines and to be apart from said contact lines, said bridge conductor being brought into contact with said contact lines when said cord member is pressed, wherein a neutral axis (i.e., the axis about which the deformation occurs) of said cord switch is positioned on the side of the one of said two inner portions with respect to the central point of the distance between said two wall portions.

The cord switch which includes the hollow flexible cord member is characterized by a cross sectional configuration of the cord member. The cross sectional configuration of the cord member is structured such that the neutral axis (i.e., the neutral line) of the cord switch is positioned on the side of the one of said two inner portions with respect to the central point of the distance between said two wall portions.

Accordingly, when the cord switch is mounted through the wall portion of the cord member provided with the contact lines on the inner peripheral surface of a window frame of a vehicle, the cord switch is bent or flexed in the corner portion of the window frame, so that a tensile stress is applied to the wall portion of the cord member having the contact lines and a compression stress is applied to the wall portion of the cord member having the bridge conductor.

In this case, since the distance between the wall portion having the bridge conductor and the neutral line is longer than the distance between the wall portion having the contact lines and the neutral line, the wall portion having the bridge conductor is more bendable than the wall portion having the contact lines in the cord member. This facilitates mounting of the cord switch on the window frame of the vehicle body or the like at the corner portion thereof.

Moreover, in the cord member, the wall portion having the bridge conductor is maintained in substantially original configuration (i.e., the configuration before the cord switch is bent) even at the corner portion of the window frame. As a result, an unnecessary contact between the bridge conductor and the contact lines is prevented unless the wall portion having the bridge conductor is pressed inwardly of the cord switch.

The neutral axis is positioned in the vicinity of the wall portion having the contact lines by reducing the thicknesses of side wall portions of the cord member positioned between the two wall portions gradually toward the wall portion having the bridge conductor. Further, the cross sectional configuration of the cord member may have a substantially trapezoidal, a substantially semi-circular or a substantially triangular configuration.

In accordance with a second embodiment of the present invention, in the cord switch of the first embodiment, at least one of the contact lines and the bridge conductor made of a conductive rubber material. For this reason, the at least one of the contact lines and the bridge conductor can be deformed easily in conformity with the deformation of the cord switch.

In accordance with a third embodiment of the present invention, in the cord switch of the first or second embodiment, the bridge conductor has first projections which project toward contact lines at the end portions thereof in the widthwise direction of the cord member. For this reason, even if a pressing force from a diagonal direction acts on the wall portion of the cord member having the bridge conductor, the bridge conductor is diagonally moved toward the contact lines, the first projections are in contact with the contact lines, so that very reliable switching-over of the cord switch can be effected.

In accordance with a forth embodiment of the present invention, in the cord switch of the third embodiment, the bridge conductor has a second projection which projects toward contact lines at a substantially central portion, in the widthwise direction of the cord member, of a bridge conductor. For this reason, even if a pressing force from a transverse direction acts on the cord switch to be deformed largely and one of the first projections is not brought into contact with a corresponding contact line of the contact lines, the second projection is brought into contact with the corresponding contact line, so that a very reliable switching-over of the cord switch can be effected.

In accordance with a fifth embodiment of the present invention, the cord switch of any one of the above embodiments has mounting means for mounting the cord switch to a member on which the cord switch is mounted, the mounting means including one of a projecting portion and a recessed portion into which the projecting portion is press-fitted and the member on which the cord switch is mounted including the other of the recessed portion and the projecting portion. For this reason, the cord switch is mounted on the member by merely pressing the cord switch to the member on which the cord switch is mounted.

In accordance with a sixth embodiment of the present invention, the cord switch of any one of the first to fourth embodiments is mounted by means of adhesion, embedding or fitting on a member on which the cord switch is mounted along the inner periphery of a window frame for a window glass which can raise and lower. In this case, when any obstacle is jammed between the glass and the cord switch, the bridge conductor is brought into contact with the contact lines and switching-over of the cord switch is conducted. As a result, it is sensed that the glass has struck any obstacle.

DETAILED DESCRIPTION OF PREFERRED EMBODIMENTS

Figure 1:
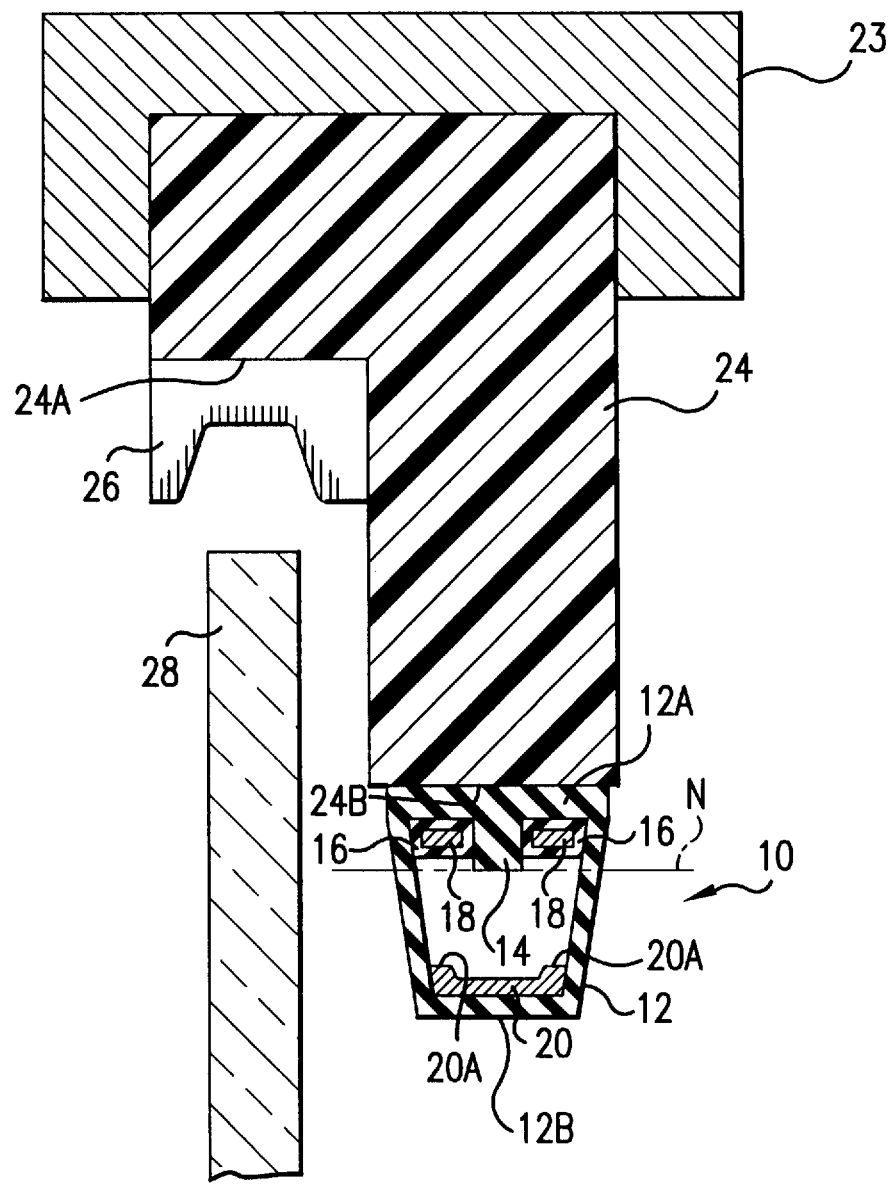
FIG. 1 is a cross sectional view which shows a state of the mounting of a cord switch according to the first embodiment of the present invention.

As shown in FIG. 1, a cord switch 10 according to the first embodiment of the present invention has a hollow flexible cord member 12 whose cross section has a inverted trapezoidal configuration. Therefore, the cord member 12 has a wide wall portion 12A (corresponding to the one of the two wall portions of the cord member opposed to each other in the aforementioned embodiments) and a narrow wall portion 12B (corresponding to the other of the two wall portions in the aforementioned embodiments) opposed to each other. The wide wall portion 12A is hereinafter referred to as an upper wall portion 12A, and the narrow wall portion 12B is hereinafter referred to as an lower wall portion 12B. Since the cross section of the cord member 12 has an inverted trapezoidal configuration, a neutral axis (line) N of the cord member 12 is positioned on the side of the upper wall portion 12A of the cord member 12 with respect to the central line (point) of the distance between the upper wall portion 12A and the lower wall portion 12B, so that the lower wall portion 12B of the cord member 12 becomes more bendable than the upper wall portion 12A and mounting of the cord member 12 on a window frame 23 of a vehicle can be facilitated. Further, when a tensile force is applied to the upper wall portion 12A and a compression force is applied to the lower wall portion 12B, namely, the cord member 12 is bent such that the lower wall portion 12B is positioned inwardly, a substantially original cross sectional configuration of the cord member 12 is maintained at the lower wall portion 12B thereof, so that an oversensitive contact between the upper wall portion 12A and the Lower wall portion 12B is prevented. Accordingly, a malfunction of the cord switch is prevented.

On the other hand, a barrier wall 14 projects inwardly from the central portion, in the widthwise direction of the cord member 12, of the upper wall portion 12A and extends along the longitudinal direction of the cord member 12. Two elongated conductive rubbers 16 serving as contact lines and extending along the longitudinal direction of the cord member 12 are provided on the inner surface of the upper wall portion 12A in parallel to each other. The conductive rubbers 16 are isolated from each other by providing the barrier wall 14 therebetween as described above. Further, using the conductive rubbers 16 as the contact lines makes the whole body of the cord switch 10 more bendable than using only metal conductive lines. Moreover, the barrier wall 14 needs not to be provided between the conductive rubbers 16. However, works involved in adjusting the distance between the conductive rubbers 16 to place the conductive rubbers at predetermined positions can be reduced by providing the barrier wall 14 between the conductive rubbers 16.

A plain woven line 18 which consists of plain-weaving conductive line (i.e., a conductor) is embedded in each of the conductive rubbers 16 so as to decrease the electrical resistance of each of the contact lines. Further, the neutral axis of the cord switch 10 can be caused to approach to the upper wall portion 12A by embedding the plain woven line 18 in the conductive rubber 16 to be closer to the upper wall portion 12A.

Meanwhile, an elongated bridge conductor 20 which consists of a conductive rubber is disposed on the inner surface of the lower wall portion 12B of the cord member 12 in a predetermined distance apart from the conductive rubbers 16. The bridge conductor 20 has a width necessary to bridge the conductive rubbers 16 when it is moved to the upper wall portion 12A. Convex line portions 20A, or projecting portions, projecting towards the upper wall portion 12A and extending along the longitudinal direction of the cord member 12 are formed at the end portions of the bridge conductor 20 in the transverse direction thereof and are positioned closer to the conductive rubbers 16 than the middle portion, in the widthwise direction of the cord member 12, of the bridge conductor 20.

Next, a state in which the cord switch 10 according to the embodiment of the present invention is mounted on the window frame 23 of the vehicle body will be described in detail, hereinafter.

Figure 4:
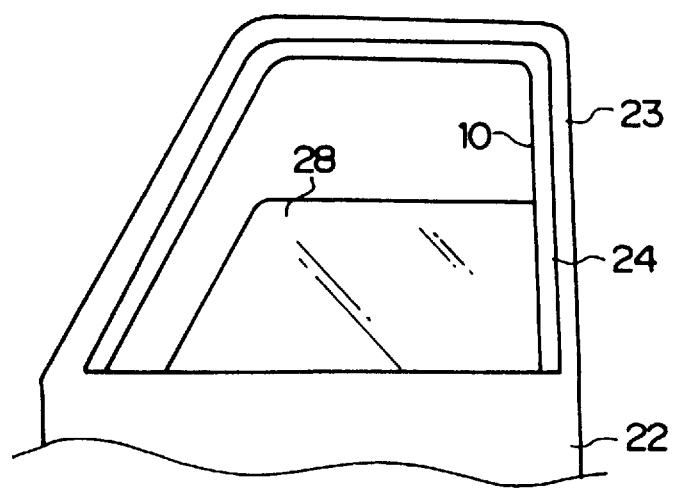
FIG. 4 is a side view which shows the mounting of a window frame on the cord switch according to the first embodiment of the present invention.

As shown in FIGS. 1 and 4, the window frame 23 of the vehicle door 22 has a generally U-shaped configuration and a weather strip 24 is mounted in a generally U-shaped window frame 23 along the inner peripheral wall of the window frame 23. The weather strip 24 has a substantially L-shaped cross sectional configuration. A glass sealing member 26 is attached to a step portion 24A of the weather strip 24. The outer edge of the raised glass 28 is fitted into the glass sealing member 26 so as to close the opening of the window frame 23.

Further, the upper wall portion 12A of the cord switch 10 is adhered to the lower edge portion 24B of the weather strip 24 and it should be noted that the cord switch 10 is disposed at a position slightly shifted from the moving track of the door glass 28. For this reason, even when the door window is closed fully by the window glass 28, the cord switch 10 is not pressed by the door glass 28 and is not switched over, accordingly. Therefore, it becomes unnecessary to dispose a limit switch or the like for detecting the position of the door glass to judge whether the opening of the door window is fully closed by the door glass 28 or any obstacle is jammed between the door glass and the window frame 23. As a result, a jam preventing mechanism is simplified and the control circuitry for the cord switch 10 can also be simplified.

Further, a portion of the mounted cord switch 10 which corresponds to a corner portion of the weather strip 24 is bent along the curvature of the corner portion of the weather strip 24. However, since the lower wall portion 12B of the cord switch 10 is more bendable than the upper wall portion 12A thereof, the cross sectional configuration of the lower wall portion 12B of the cord switch 10 is generally maintained in its original configuration and the distance between the bridge conductor 20 and the conductive rubbers 16 is generally maintained in its original distance even after the cord switch 10 has been bent, so that the bridge conductor 20 and the conductive rubbers 16 are not brought into contact with each other unnecessarily even during the mounting work of the cord switch 10.

Figure 2:
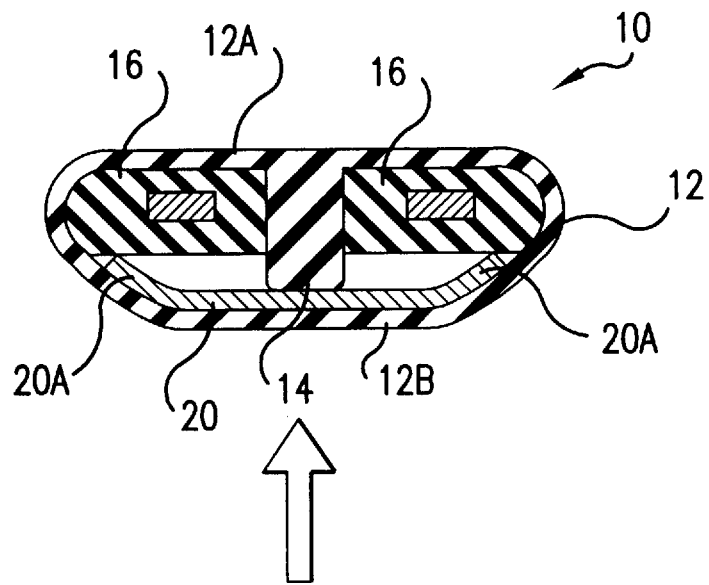
FIG. 2 shows a cross sectional view when a pressing force acts on the cord switch from directly beneath the cord switch according to the first embodiment of the present invention.

As shown in FIG. 2, when any obstacle is jammed, or clamped, between the door glass 28 and the cord switch 10, the lower wall portion 12B is pressed upwardly and the bridge conductor 20 bridges, or contacts, the conductive rubbers 16. Therefore, the cord switch 20 is switched over so as to stop or reverse (i.e., inversely lower the window glass 28) an elevating apparatus or a window regulating apparatus (not shown). Further, the sensitivity of the cord switch 10 can be adjusted without difficulty by changing the height of the barrier wall 14 which projects toward the bridge conductor 20.

Figure 3:
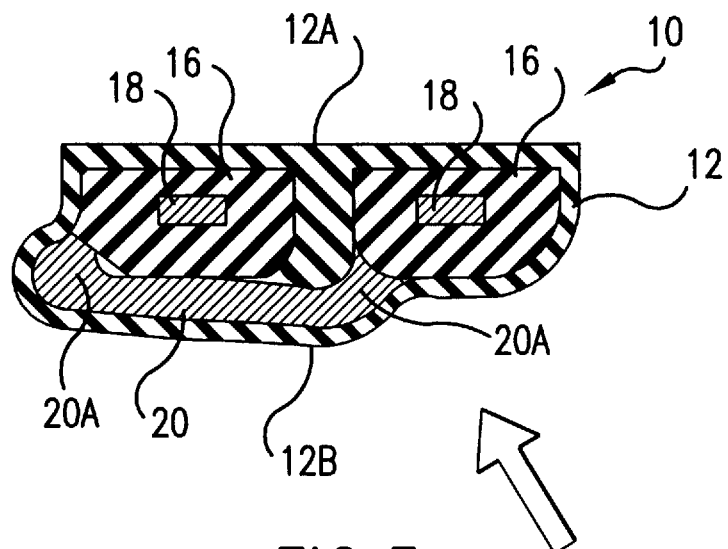
FIG. 3 shows a cross sectional view when a pressing force from a diagonal direction acts on the cord switch according to the first embodiment of the present invention.

As shown in FIG. 3, even when a pressing force acts on the cord switch 10 diagonally and upwardly so that the bridge conductor 20 is pressed diagonally and upwardly, each corresponding projections 20A and each corresponding conductive rubber 16 are brought into contact with each other. Thus, very reliable switching-over of the cord switch can be effected in the cord switch 10.

Figure 5:
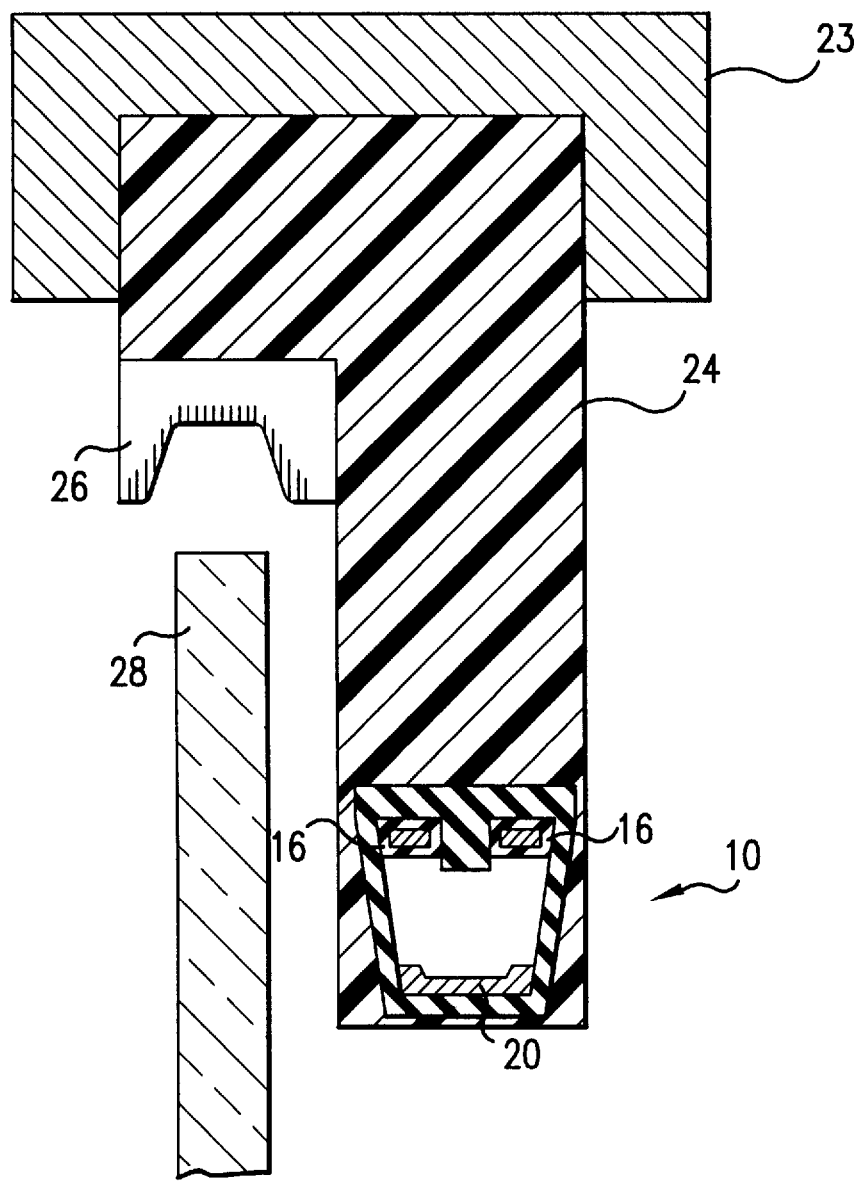
FIG. 5 is a cross sectional view which shows an exemplary mounting of a cord switch embedded entirely within the weatherstrip according to another embodiment of the invention.
Figure 6:
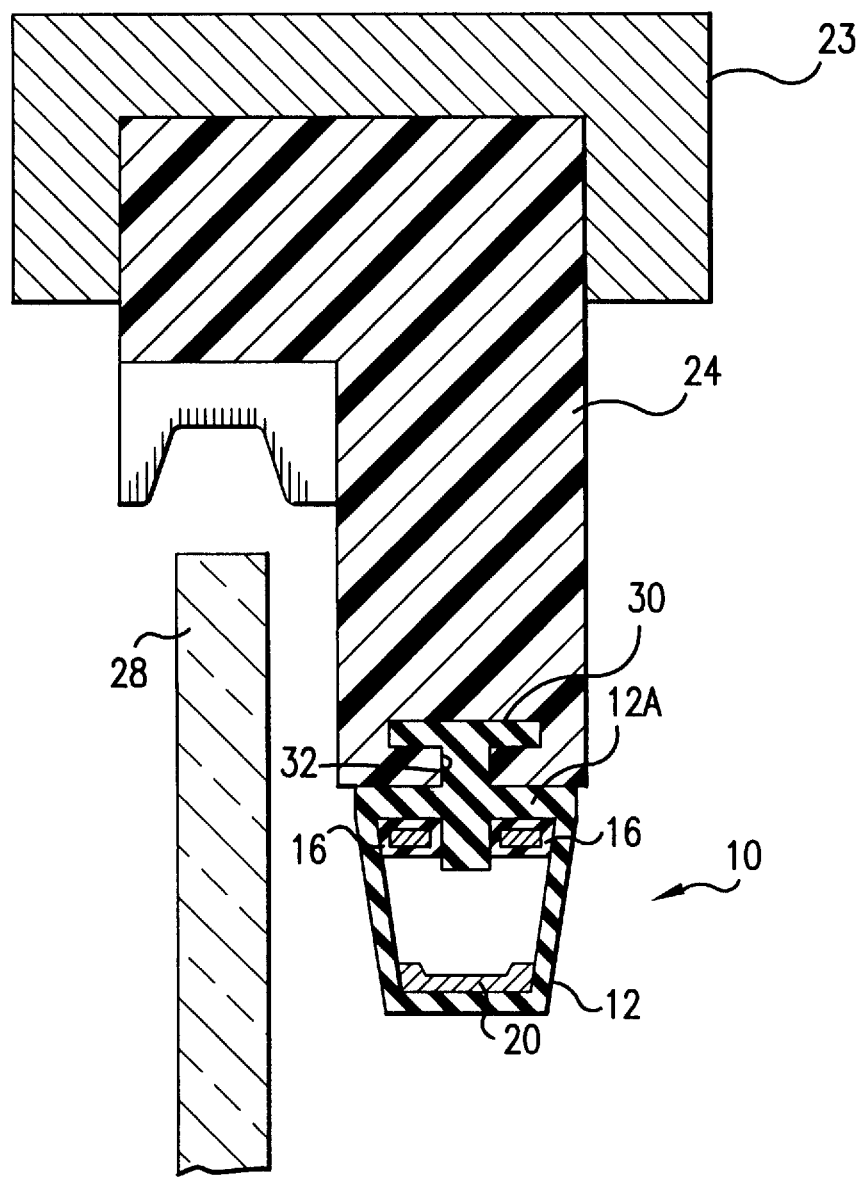
FIG. 6 is a cross sectional view which shows an exemplary mounting of a cord switch with a T-shaped projection mounted within the weatherstrip according to another embodiment of the present invention.
Figure 7:
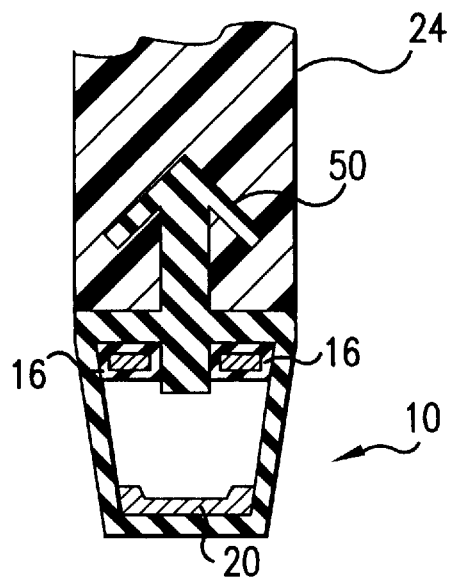
FIG. 7 is a cross sectional view which shows an exemplary mounting of a cord switch with an anchor-shaped or arrow-shaped projection mounted in the weatherstrip according to another embodiment of the present invention.
Figure 8:
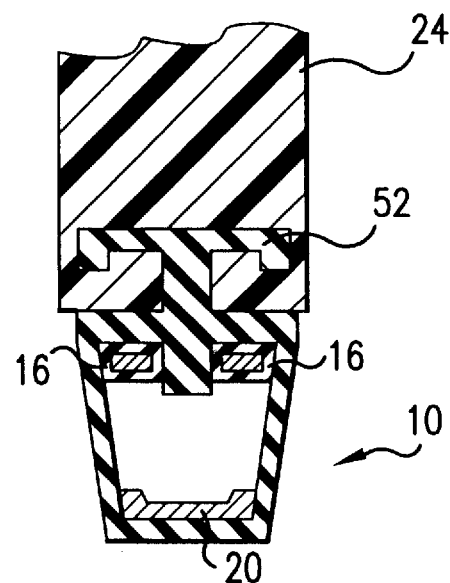
FIG. 8 is a cross sectional view which shows an exemplary mounting of a cord switch with an umbrella-shaped projection mounted within the weatherstrip according to another embodiment of the present invention.
Figure 9:
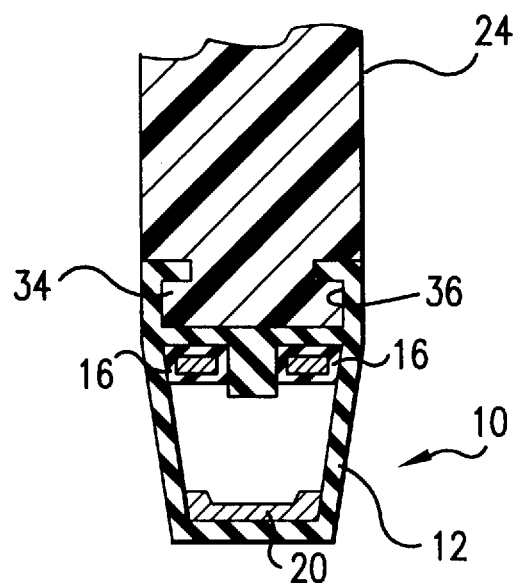
FIG. 9 is a cross sectional view which shows an exemplary mounting of a cord switch with a projection portion formed on the weatherstrip and a recessed portion formed in the cord member.

In accordance with the embodiment of the present invention, the cord switch 10 is adhered to the weather strip 24. However, as shown in FIG. 5, the cord switch 10 may be embedded in the weather strip 24. Further, as shown in FIG. 6, a projection 30 having the T-shaped configuration is provided on the upper wall portion 12A of the cord member 12. If a recessed portion 32 into which the T-shaped projection 30 is press-fitted is formed in the weather strip 24, the mounting work of the cord switch 12 can be simplified by this structure. The cross section of the projection described above is not limited to a T-shaped configuration. Namely, an anchor-shaped (arrow-shaped) projection which is shown in FIG. 7 or an umbrella-shaped one which is shown in FIG. 8 may be used, alternatively. Further, as shown in FIG. 9, a projecting portion 34 may be formed on the weather strip 24 and a recessed portion 36 into which the projecting portion 34 is press-fitted may be formed on the cord member 12.

Figure 10:
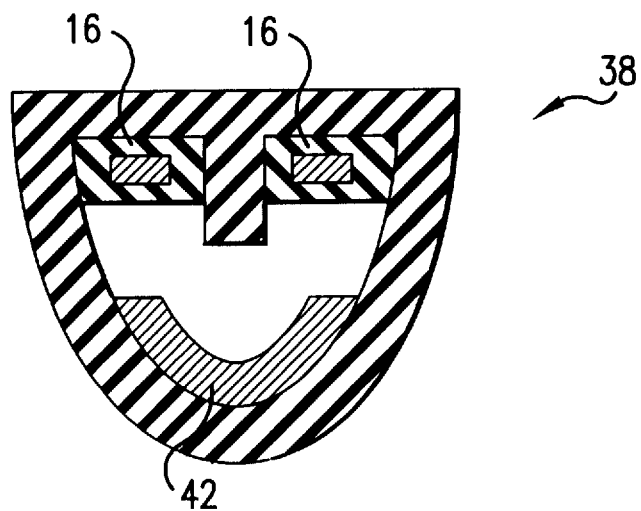
FIG. 10 is a cross sectional view of a cord switch having a semicircular configuration according to another embodiment of the present invention.
Figure 11:
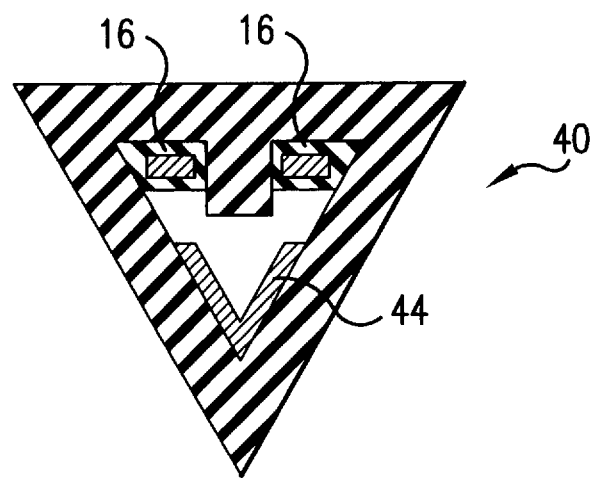
FIG. 11 is a cross sectional view of a cord switch having a triangular sectional configuration according to another embodiment of the present invention.

On the other hand, the cross section of the cord member 12 is not limited to the above-mentioned trapezoidal configuration. In order to position a neutral axis of the cord member on the side of the upper wall portion with respect to the central line of the distance between the upper wall portion and the lower wall portion, a cord switch 38 having a semi-circular sectional configuration may be used as shown in FIG. 10 and a cord switch 40 having a substantially triangular sectional configuration may also be used as shown in FIG. 11. Since each of the cord switches 38 and 40 has the above-described cross sectional configuration, it is not necessary to provide bridge conductors 42 and 44 with projections or convex portions, which is different from the cord switch 10 of the first embodiment. Therefore, the bridge conductor 42 has a substantially U-shaped cross-sectional configuration and the bridge conductor 44 has a substantially V-shaped cross-sectional configuration. These bridge conductors 42 and 44 are reliably brought into contact with the two conductive layers 16 when the lower wall portions of the cord switch 38 and 40 are pressed upwardly.

Figure 12:
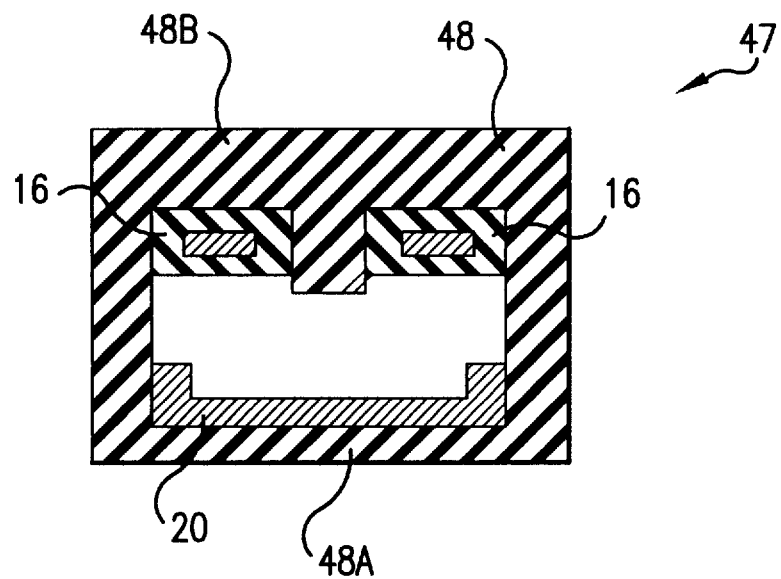
FIG. 12 is a cross sectional view of a cord switch with a variation of the contact structure with respect to a neutral axis according to another embodiment of the present invention.
Figure 13:
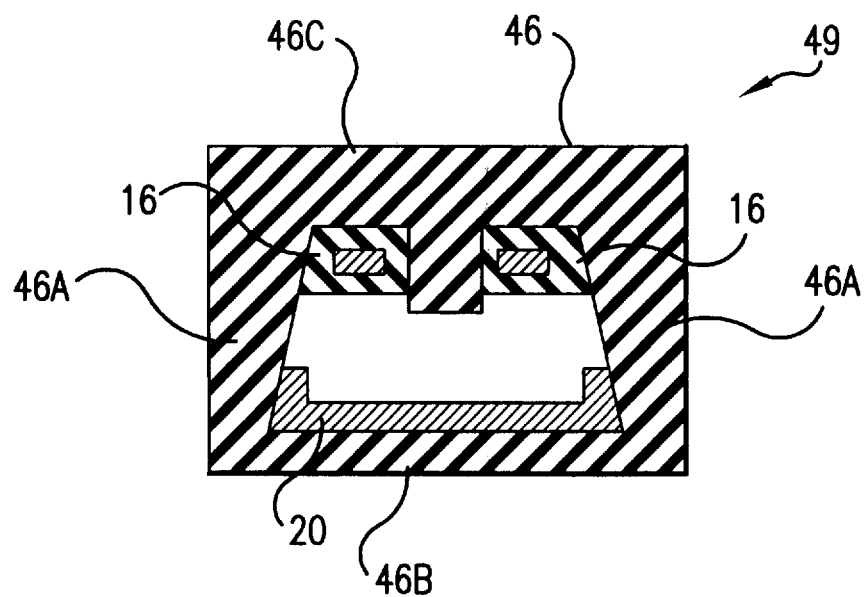
FIG. 13 is a cross sectional view of a cord switch with another variation of the contact structure of FIG. 12 according to another embodiment of the present invention.

Moreover, in a cord switch 47 of another embodiment shown in FIG. 12, the neutral axis may be positioned on the side of an upper wall portion 48B of a cord member 48 with respect to the central line of the cross sectional height of the cord switch 47 by reducing the thickness of a lower wall portion 48A of the cord member 48. In a cord switch 49 of another embodiment shown in FIG. 13, a cord member 46 has a rectangular cross sectional configuration. The neutral axis of the cord switch 49 may be positioned on the side of the upper wall portion 46C of the cord member 46 with respect to the central line of the cross sectional height of the cord switch 49 by reducing the thicknesses of side wall portions 46A of the cord member 44 gradually toward a lower wall portion 46B.

Figure 14:
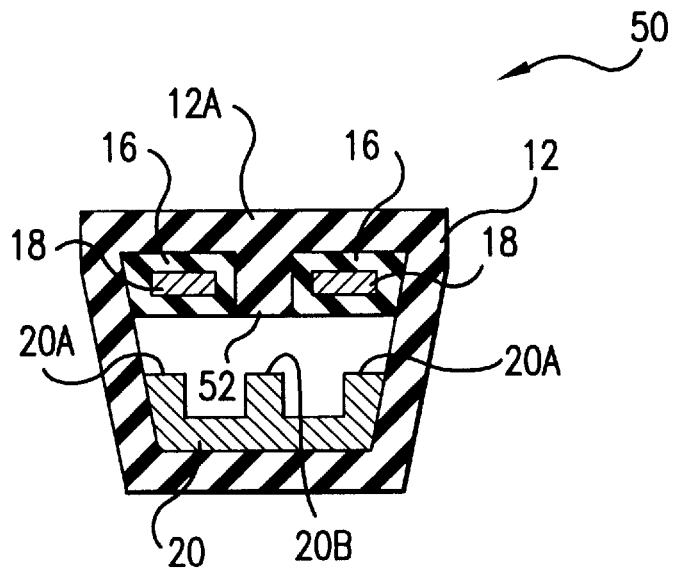
FIG. 14 is a cross sectional view of a cord switch in which the barrier is flush with the conductive rubbers according to another embodiment of the present invention.

Further, in a cord switch 50 shown in FIG. 14, a barrier wall 52 is substantially flush with the conductive rubbers 16 and is disposed at the upper wall portion 12A. Another projection or convex portion 20B may be formed substantially at the central portion of the bridge conductor 20 in the transverse direction thereof.

Figure 15:
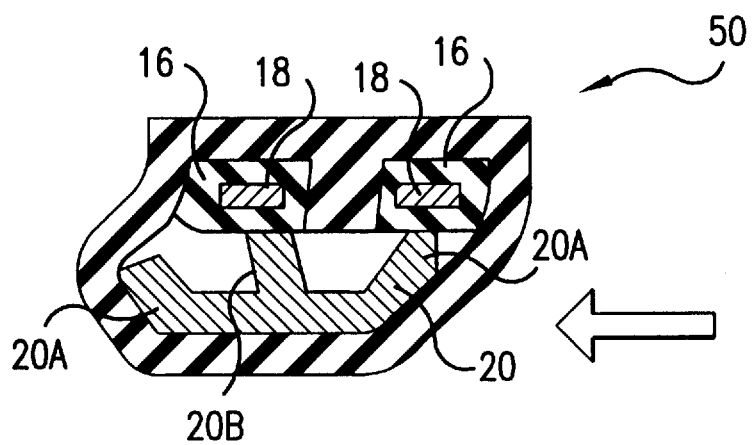
FIG. 15 is a cross sectional view which shows the state of the cord switch according to the embodiment in FIG. 14 deformed when the pressing force from a transverse direction acts on the cord switch.
Figure 16:
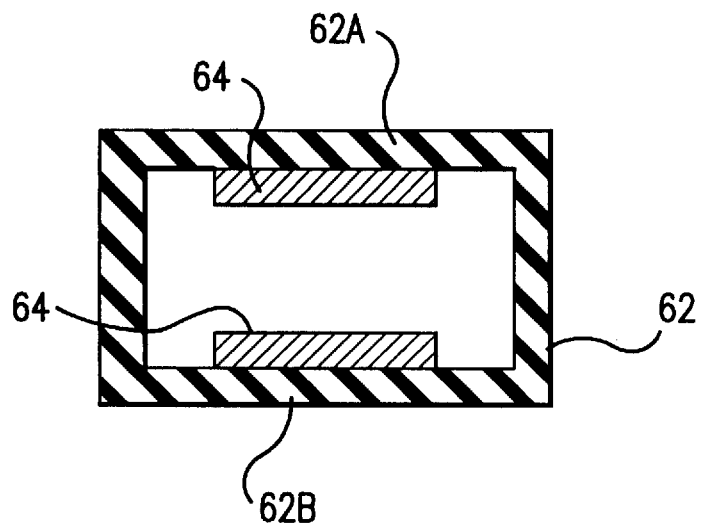
FIG. 16 is a cross sectional view of a conventional cord switch.
Figure 17:
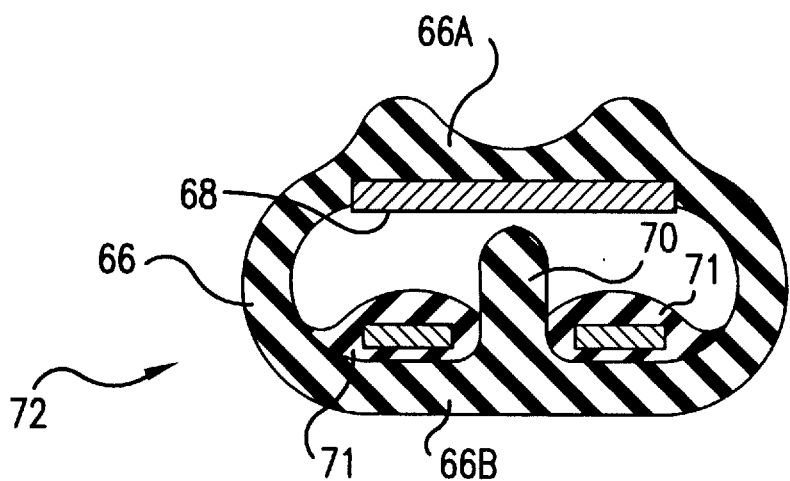
FIG. 17 is a cross sectional view of another conventional cord switch.

Therefore, as shown in FIG. 15, even if a pressing force from a transverse direction acts on the cord switch 50 and the bridge conductor 20 deforms largely, the projection 20B and either one of the projections 20A are brought into contact with the conductive rubbers 16, so that very reliable switching-over of the cord switch 50 can be effected.

Further, although the cord switches according to the embodiments of the present invention have been applied to the jam preventing apparatus used for the door glass of the vehicle, the cord switch of the present invention can be applied to a driverless or radio-controlled vehicle in which the cord switch is mounted on a bumper or the like of the vehicle so as to detect a collision of the vehicle.

What is claimed is:

1. A cord switch, comprising:
   a hollow flexible cord member;
   contact lines which are disposed in parallel to each other on one of the inner portions of the two portions of said cord member generally opposed to each other and which are spaced apart from each other in the transverse direction of said cord member;
   a bridge conductor which is disposed on the other of said two inner portions so as to be generally opposed to said contact lines and being apart from said contact lines, said bridge conductor being brought into contact with said contact lines when said cord member is pressed,
   wherein a neutral axis of said cord switch is positioned on the side of the one of said two inner portions with respect to the central point of the distance between said two wall portions.

2. A cord switch according to claim 1, wherein at least one of said contact lines and said bridge conductor is made of conductive rubber material.

3. A cord switch according to claim 2, wherein said bridge conductor has first projections at the end portions of said bridge conductor projecting toward said contact lines.

4. A cord switch according to claim 3, wherein said bridge conductor has a second projection at a substantially central portion of said bridge conductor extending toward said contact lines.

5. A cord switch according to claim 4, further comprising mounting means for mounting said cord switch to a first member said mounting means including one of a projection and a recessed portion into which said projection is press-fitted and said first member including the other of the projection and the recessed portion.

6. A cord switch according to claim 4, wherein said cord switch is mounted by adhesion, embedding or fitting on a member along a window frame for a window glass to be raised and lowered.

7. A cord switch according to claim 3, further comprising mounting means for mounting said cord switch to a first member said mounting means including one of a projection and a recessed portion into which said projection is press-fitted and said first member including the other of the projection and the recessed portion.

8. A cord switch according to claim 3, wherein said cord switch is mounted by adhesion, embedding or fitting on a member along a window frame for a window glass to be raised and lowered.

9. A cord switch according to claim 1, wherein said bridge conductor has first projections at the end portions of said bridge conductor projecting toward said contact lines.

10. A cord switch according to claim 9, wherein said cord switch is mounted by adhesion, embedding or fitting on a member along a window frame for a window glass to be raised and lowered.

11. A cord switch according to claim 9, wherein said bridge conductor has a second projection at a substantially central portion of said bridge conductor extending toward said contact lines.

12. A cord switch according to claim 9, further comprising mounting means for mounting said cord switch to a first member said mounting means including one of a projection and a recessed portion into which said projection is press-fitted and said first member including the other of the projection and the recessed portion.

13. A cord switch according to claim 11, further comprising mounting means for mounting said cord switch to a first member said mounting means including one of a projection and a recessed portion into which said projection is press-fitted and said first member including the other of the projection and the recessed portion.

14. A cord switch according to claim 11, wherein said cord switch is mounted by adhesion, embedding or fitting on a member along a window frame for a window glass to be raised and lowered.

15. A cord switch according to claim 2, further comprising mounting means for mounting said cord switch to a first member said mounting means including one of a projection and a recessed portion into which said projection is press-fitted and said first member including the other of the projection and the recessed portion.

16. A cord switch according to claim 2, wherein said cord switch is mounted by adhesion, embedding or fitting on a member along a window frame for a window glass to be raised and lowered.

17. A cord switch according to claim 1, further comprising mounting means for mounting said cord switch to a first member said mounting means including one of a projection and a recessed portion into which said projection is press-fitted and said first member including the other of the projection and the recessed portion.

18. A cord switch according to claim 1, wherein said cord switch is mounted by adhesion, embedding or fitting on a member along a window frame for a window glass to be raised and lowered.

19. A cord switch according to claim 1, wherein the cross sectional configuration of said cord member has a substantially trapezoidal, a substantially semi-circular or a substantially triangular configuration.

20. A cord switch according to claim 1, wherein said cord switch is mounted by adhesion, embedding or fitting on a member along a bumper of a vehicle.

* * * * *